United States Patent [19]

Shriver

[11] 4,055,089
[45] Oct. 25, 1977

[54] SEMICONDUCTOR PROJECTILE IMPACT DETECTOR

[75] Inventor: Edward L. Shriver, Huntsville, Ala.

[73] Assignee: The United States of America as represented by the Administrator of the National Aeronautics and Space Administration, Washington, D.C.

[21] Appl. No.: 665,734

[22] Filed: Mar. 11, 1976

[51] Int. Cl.² .................................................. G01L 1/14
[52] U.S. Cl. ..................................... 73/432 R; 73/28; 73/432 PS; 73/DIG. 11
[58] Field of Search ........... 73/12, 28, 432 R, 432 PS, 73/DIG. 11

[56] References Cited

U.S. PATENT DOCUMENTS

| 2,944,250 | 7/1960 | Putt | 73/432 R |
| 3,307,407 | 3/1967 | Berg et al. | 73/432 R |
| 3,407,304 | 10/1968 | Kinard et al. | 73/12 X |
| 3,587,291 | 6/1971 | Escullier et al. | 73/12 |
| 3,805,591 | 4/1974 | Willis et al. | 73/12 X |

Primary Examiner—Richard C. Queisser
Assistant Examiner—Charles Gorenstein
Attorney, Agent, or Firm—L. D. Wofford, Jr.; George J. Porter; J. R. Manning

[57] ABSTRACT

A semiconductor projectile impact detector for use in determining micrometeorite presence as well as its flux and energy comprises a photovoltaic cell which generates a voltage according to the light and heat emitted by the micrometeorites upon impact with the cell. A counter and peak amplitude measuring device are used to indicate the number of particles which strike the surface of the cell as well as the kinetic energy of each of the particles.

4 Claims, 1 Drawing Figure

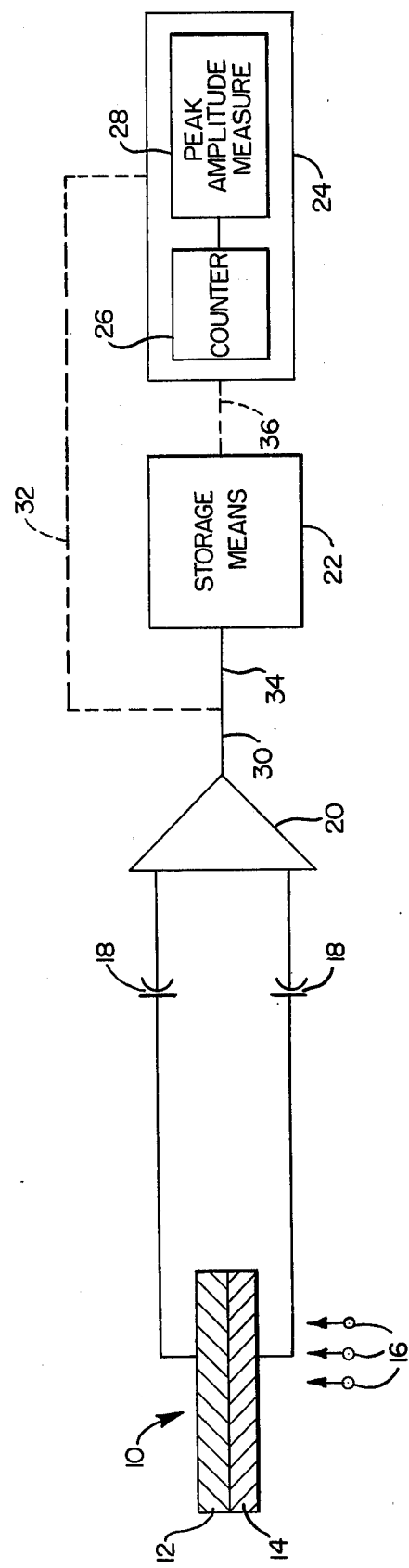

SEMICONDUCTOR PROJECTILE IMPACT DETECTOR

ORIGIN OF THE INVENTION

The invention described herein was made by an employee of the United States Government and used by or for the Government for governmental purposes without the payment of any royalties thereon or therefor.

FIELD OF THE INVENTION

This invention relates to a method and device for the detection and investigation of cometary coma environments by determining the number density of the particulates in the coma, and also the kinetic energy of each of the particles.

BACKGROUND OF THE INVENTION

Due to the increased amount of space travel which has been conducted in the last few years, it has been discovered that many microscopic particulates and cometary comas travelling at great speeds are prevalent in deep space. These particulates which, for example, are present on the tails of comets, are of great interest to scientists as a tool in helping to unravel the many mysteries of deep space, as well as space engineers who study these particles in order to be able to design an adequate capsule, rocket or space vehicle skin which would be impervious to the repeated impacts of these small microscopic particulates.

Prior art detectors include the use of optical devices and pressurized meteor detectors. Optical devices are unsatisfactory in the environment of interest because these devices tend to become light limited in the vicinity of a comet. Pressurized meteor detectors have limited application because they tend to respond only to particles having relatively high impact velocity and become inoperative after one impact.

Other prior art devices utilize a solar battery or photovoltaic cell such as is disclosed in U.S. Pat. No. 2,944,250 to Outt. This patent shows a method of determining meteor flux by employing a number of series and parallel connected solar batteries. One of these batteries is utilized to indicate the missile roll rate and missile aspect angle of attack, while the other batteries are used as a means for measuring the integrated eroding effects of the high velocity meteorite particles. This patent gathers information regarding mass per unit time, particle number per unit time and particle-size distribution needed for calculating effects on skins of missiles and space vehicles by measuring the deterioration in the output of a solar battery due to the sandblasting effect of the cell by the micrometeorites. A first reading is taken at $T_1$ and a second reading is taken at $T_2$. The difference in the intensity of these readings therefore gives rise to meteor flux during the time period $T_2-T_1$. Therefore, since the output of Outt gives an integrated reading, it cannot measure the exact number of impacts nor can it measure the kinetic energy of each of the particulates.

SUMMARY OF THE INVENTION

It is therefore an object of the present invention to overcome the defects of the prior art as indicated above.

Another object of the present invention is to produce a projectile impact detector which may be used in deep space.

Another object of the present invention is to produce a projectile impact detector which utilizes a photovoltaic cell.

A further object of the present invention is to produce a projectile impact detector which counts the number of particulate impacts.

Yet another object of the present invention is to produce a projectile impact detector which can measure the kinetic energy of each of the particulates which strike the detector.

These and other objects of the present invention are accomplished by a device which utilizes a P/N type photovoltaic cell to measure the number density of particulates in a cometary coma. This cell is sensitive to the light and heat generated by a hypervelocity impact by a projectile giving rise to a voltage across the cell which can be measured by appropriate instrumentation. This instrumentation includes a counting device for counting the number of voltage pulses as well as a peak amplitude measuring device for measuring the peak amplitude of each of the voltage pulses. Since the light intensity generated by the impacting projectile is proportional to the kinetic energy of the projectile, the recordation of the peak amplitude of the voltage pulses generated by the photovoltaic cell enables the energy of each projectile to be computed. Therefore, if velocity information exists for the particulates, the particulate mass can be determined.

BRIEF DESCRIPTION OF THE DRAWING

The above and additional objects and advantages inherent in the present invention will become more apparent by reference to the description of an illustrated embodiment in the drawing thereof in which FIG. 1 is a schematic drawing of the projectile impact detector in accordance with the present invention.

DETAILED DESCRIPTION OF A PREFERRED EMBODIMENT

FIG. 1 shows the projectile impact detector which includes a photovoltaic cell 10 composed of P type semiconductor material 12 and N type semiconductor material 14 such as silicon, germanium or gallium arsenide. Although most solar batteries or photovoltaic cells which are used as power sources include a cover plate and interference filter that selectively filters certain wavelengths thereby preventing the solar battery from overheating, the cell of the present device does not include such a plate or filter so that the impacting projectiles 16 travelling toward the photovoltaic cell 10 actually impact the semiconductor material. If the impact detector is used to monitor particle occurrence in outer space, the cell 10 is affixed to the outer skin of the missile, capsule or the space vehicle. However, the invention should not be construed to be so limited, since it can be appreciated that it may be used in inner space environments, such as laboratories, where particle size and energy information are desired, or in situations where the outer space environment is simulated.

A pair of "AC" coupling capacitors 18 are used so that only the energy of impacts above some threshold value are obtained. These capacitors are necessary to effectively filter out any extraneous noise or impacts of very minute particles which are of no interest. They also serve to block the D.C. component of the photovoltaic cell. Differential amplifier 20 is used to strengthen the signals obtained from the impacting of the projectiles onto the cell, as well as to detect the voltage produced by the cell.

The signal output 30 of the differential amplifier 20 may either be transmitted to a suitable storage means 22, such as magnetic tape which is present in the missile, or it can be directly transmitted by a standard telemetry circuit 32 to a processing device 24 containing a counter 26 and a peak amplitude measuring device 28. The counter 26 is used to count the number of impacts on the photovoltaic cell 10, and the peak amplitude measuring means 28 is used to measure the peak voltage of each of the voltage pulses generated by the impact of the particulates. If the signal 30 is stored in the storage means 22, once the missile or other capsule is recovered, the information stored therein is then directly transferred through appropriate circuitry 36 to the measuring device 24.

The present invention operates in the following manner a single or a series of photovoltaic cells are affixed to the outer skin of an outer space vehicle such as a capsule or missile so that the properties of the particulates present in deep space can be analyzed, or if laboratory study is desired, the cells themselves are simply introduced into the environment of interest. The impact of projectiles 16 onto the photovoltaic cell 10 generates light and heat which is proportional to the kinetic energy of the projectile, and therefore is also proportional to the voltage generated by the cell 10. This voltage passes through AC coupling capacitors 18 and differential amplifier 20 so that only the number of impacts and energy of impacts above some threshold value are obtained. The generated signal 30 is then either transmitted directly to a data measuring device 24 or is stored in a suitable storage means 22 and then transmitted to the measuring device 24 at a later time.

The measuring means 24 contains a counter 26 and peak amplitude measuring device 28. The counter 26 counts the number of impacts of projectiles and the peak amplitude measuring device 28 indicates the voltage generated by each of the impacts and therefore also indicates the kinetic energy of each of the projectiles. If, therefore, the velocity of each of these projectiles can be determined, the mass of the respective projectile can be ascertained.

The present invention has been tested in laboratory environments by bombarding the photovoltaic cell with particles from a light gas gun using helium as the accelerating gas. It was found that good readings were still obtained even though the cell was struck many times.

While this invention has been described in conjunction with a missile travelling in outer space, the present device can also be used for detecting simulated micrometeorite impacts in the laboratory. This usage would be for the design of spacecraft equipment in order to render it insensitive to meteorite impact below some threshold value. Furthermore, if used on a spacecraft utilizing a photovoltaic cell arrangement for spacecraft power, this same arrangement may be utilized as a large area meteoroid detector.

Furthermore, while this invention has been described in great detail, it will be obvious to those skilled in the art that various changes may be made without departing from the scope of the invention and that the invention is not to be considered limited to what is shown in the drawing and described in the specification.

What is claimed is:

1. A method for investigating the nature of hypervelocity particles comprising the steps of:
   a. introducing a coverless solid-state photovoltaic cell into an environment containing said particles;
   b. measuring the peak amplitude of voltage pulses developed across the cell in response to the particles impacting thereon; and
   c. counting the number of pulses produced by the cell.

2. Apparatus for investigating the nature of hypervelocity particles comprising:
   a. a coverless, solid-state, two-terminal photovoltaic cell responsive to the impact thereon of a hypervelocity particle for generating a voltage pulse across the terminals proportional to the kinetic energy of the impacting particle.
   b. a counter responsive to the terminal voltage of the cell for counting the number of voltage pulses produced by the cell as a consequence of impacting particles; and
   c. peak amplitude measuring means responsive to the terminal voltage of the cell for measuring the peak value of the voltage pulses reduced by the cell as a consequence of impacting particles.

3. Apparatus according to claim 2 including threshold means interposed between the terminals of the cell and the counter and the measuring means for preventing the counter and the measuring means from responding to a voltage pulse produced by the cell as a consequence of an impacting particle whenever the amplitude of the pulse is below a threshold.

4. Apparatus according to claim 3 including storage means for storing a representation of the voltage pulses produced by the cell.

* * * * *